(12) United States Patent
Hsu et al.

(10) Patent No.: US 9,904,154 B2
(45) Date of Patent: Feb. 27, 2018

(54) PICO PROJECTOR HAVING A COVER WHICH CAN BE OPENED

(71) Applicants: Sintai Optical (Shenzhen) Co., Ltd., Shenzhen, Guandong Province (CN); Asia Optical International Ltd., Tortola (GB)

(72) Inventors: Chiao-Sen Hsu, Taichung (TW); Sen-Yung Liu, Taichung (TW)

(73) Assignees: SINTAI OPTICAL (SHENZHEN) CO., LTD., Shenzhen, Guandong Province (CN); ASIA OPTICAL INTERNATIONAL LTD., Tortola (VG)

( * ) Notice: Subject to any disclaimer, the term of this patent is extended or adjusted under 35 U.S.C. 154(b) by 43 days.

(21) Appl. No.: 14/877,959

(22) Filed: Oct. 8, 2015

(65) Prior Publication Data

US 2016/0112687 A1   Apr. 21, 2016

(30) Foreign Application Priority Data

Oct. 16, 2014   (TW) .............................. 103135860 A

(51) Int. Cl.
*G03B 21/16* (2006.01)
*G03B 21/14* (2006.01)
*H04N 9/31* (2006.01)

(52) U.S. Cl.
CPC ........... *G03B 21/145* (2013.01); *G03B 21/16* (2013.01); *H04N 9/3173* (2013.01)

(58) Field of Classification Search
CPC ..... G03B 21/145; G03B 21/16; H04N 9/3173
See application file for complete search history.

(56) References Cited

U.S. PATENT DOCUMENTS

| | | | |
|---|---|---|---|
| 6,755,541 B2 | 6/2004 | Nakano et al. | |
| 7,102,591 B2 | 9/2006 | Shih | |
| 7,258,446 B2 | 8/2007 | Jayaram et al. | |
| 7,883,215 B2 | 2/2011 | Chang et al. | |
| 2010/0171936 A1* | 7/2010 | Plut | H04N 9/3141 353/61 |
| 2013/0010268 A1* | 1/2013 | Nishima | G03B 21/16 353/52 |

FOREIGN PATENT DOCUMENTS

| | | |
|---|---|---|
| TW | 522282 B | 3/2003 |
| TW | 585311 U | 4/2004 |
| TW | I322325 B | 3/2010 |
| TW | I351575 B | 11/2011 |
| TW | 201232157 A | 8/2012 |
| TW | I411867 B | 10/2013 |

* cited by examiner

*Primary Examiner* — Sultan Chowdhury
*Assistant Examiner* — Magda Cruz
(74) *Attorney, Agent, or Firm* — McClure, Qualey & Rodack, LLP

(57) ABSTRACT

A pico projector includes a housing, a lens, a light engine, a control module and a central processing module. The housing includes a main body and a cover. The lens is disposed in the housing. The light engine is disposed in the housing and configured to produce light including image signals and project the light through the lens. The control module is configured to provide a control signal. The central processing module is disposed in the housing and configured to rotate or move the cover with respect to the main body according to the control signal so as to create an opening for enhancing heat dissipation of the interior of the housing.

20 Claims, 9 Drawing Sheets

PICO PROJECTOR HAVING A COVER WHICH CAN BE OPENED

BACKGROUND OF THE INVENTION

Field of the Invention

The invention relates to a pico projector, and more particularly to a pico projector having a cover which can be opened.

Description of the Related Art

Pico projectors can be carried conveniently. However, pico projectors are so small that all interior elements are located very closely and there is no enough space for heat dissipation of the interior elements. As a result, pico projectors may crash or slow down due to high temperature after operating for a long time. Further, when the pico projectors are used day by day, the efficiency and service life thereof may be significantly reduced. Therefore, it is necessary to provide a solution for heat dissipation of the pico projectors.

BRIEF SUMMARY OF THE INVENTION

The invention provides a pico projector capable of effectively dissipating heat generated by interior elements. The pico projector in accordance with an exemplary embodiment of the invention includes a housing, a lens, a light engine, a control module and a central processing module. The housing includes a main body and a cover. The lens is disposed in the housing. The light engine is disposed in the housing and configured to produce light including image signals and project the light through the lens. The control module is configured to provide a control signal. The central processing module is disposed in the housing and configured to rotate or move the cover with respect to the main body according to the control signal so as to create an opening for enhancing heat dissipation of the interior of the housing.

In another exemplary embodiment, the control module includes a power switch or a single functional key.

In yet another exemplary embodiment, the control module is disposed on the housing.

In another exemplary embodiment, the control module includes a remote controller disposed outside the housing and having wired or wireless electrical connection to the central processing module for controlling the cover to rotate or move.

In yet another exemplary embodiment, the control module includes a temperature sensing module disposed in the housing and configured to detect an environment temperature and output a temperature signal, and the central processing module is configured to rotate or move the cover with respect to the main body according to the temperature signal so as to create an opening for enhancing heat dissipation of an interior of the housing.

In another exemplary embodiment, the temperature signal includes a temperature value or a temperature difference value, and the central processing module rotates or moves the cover according to the temperature value or the temperature difference value.

In yet another exemplary embodiment, the temperature signal includes a temperature warning signal which is provided by the temperature sensing module when a temperature value or a temperature difference value of the detected environment temperature is greater than a predetermined value, and the central processing module rotates or moves the cover according to the temperature warning signal.

The pico projector in accordance with another exemplary embodiment of the invention includes a housing which has a main body and a cover; a lens disposed in the housing; a light engine disposed in the housing and configured to produce light including image signals and project the light through the lens; a timing module outputting a control signal at predetermined time; and a central processing module disposed in the housing and configured to rotate or move the cover with respect to the main body according to the control signal so as to create an opening for enhancing heat dissipation of the interior of the housing.

The pico projector in accordance with another exemplary embodiment of the invention includes a housing including a main body and a cover rotatable or movable with respect to the main body to create an opening for enhancing heat dissipation of the interior of the housing; a lens disposed in the housing; and a light engine disposed in the housing and configured to produce light including image signals and project the light through the lens.

In another exemplary embodiment, the pico projector further includes a fan joined to the cover and generating air flow for heat dissipation of the interior of the housing, wherein the fan is moved to change a direction, a position or an angle of the air flow when the cover is rotated or moved.

In yet another exemplary embodiment, the pico projector further includes an elastic element disposed between the cover and the main body to stably rotate or move the cover.

In another exemplary embodiment, the lens is sheltered by the cover before the cover is rotated or moved to create the opening.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
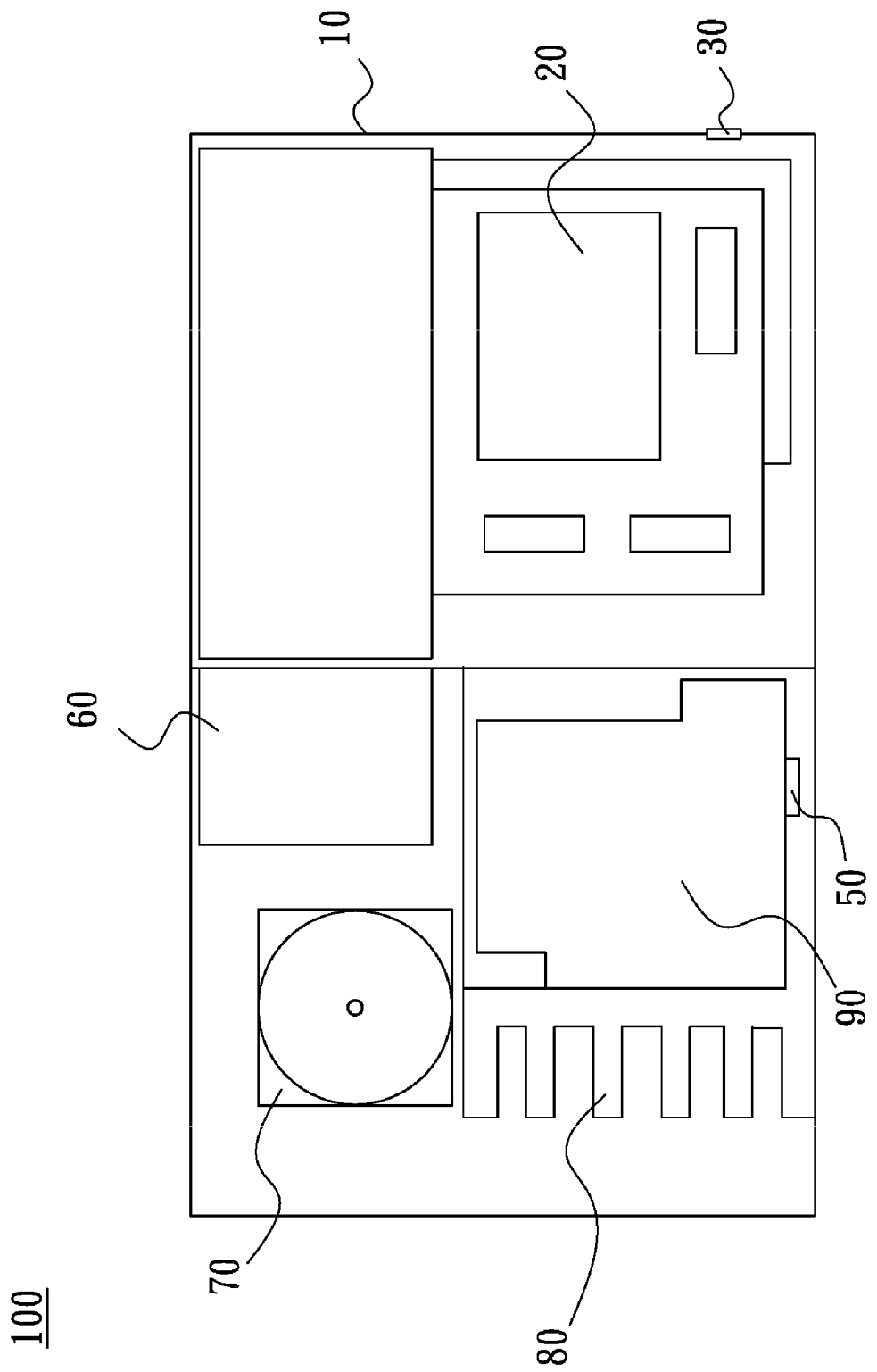
FIG. 1 depicts an arrangement of interior elements of a pico projector according to a first embodiment of the invention.

Referring to FIG. 1, a pico projector 100 of a first embodiment of the invention includes a housing 10, a fan 70, a heat sink 80, a light engine 90, a lens 50, a central processing module 20, a motor 60 and a control module 30. The housing 10 accommodates the fan 70, the heat sink 80, the light engine 90, the lens 50, the central processing module 20, the motor 60 and the control module 30. The light engine 90 produces light which includes image signals. The light is projected through the lens 50. Heat generated by the light engine 90 is conducted to the heat sink 80 for dissipation. The fan 70 generates air flow to enhance the heat dissipation. The control module 30 and the motor 60 are electrically connected to the central processing module 20.

Figure 2A:
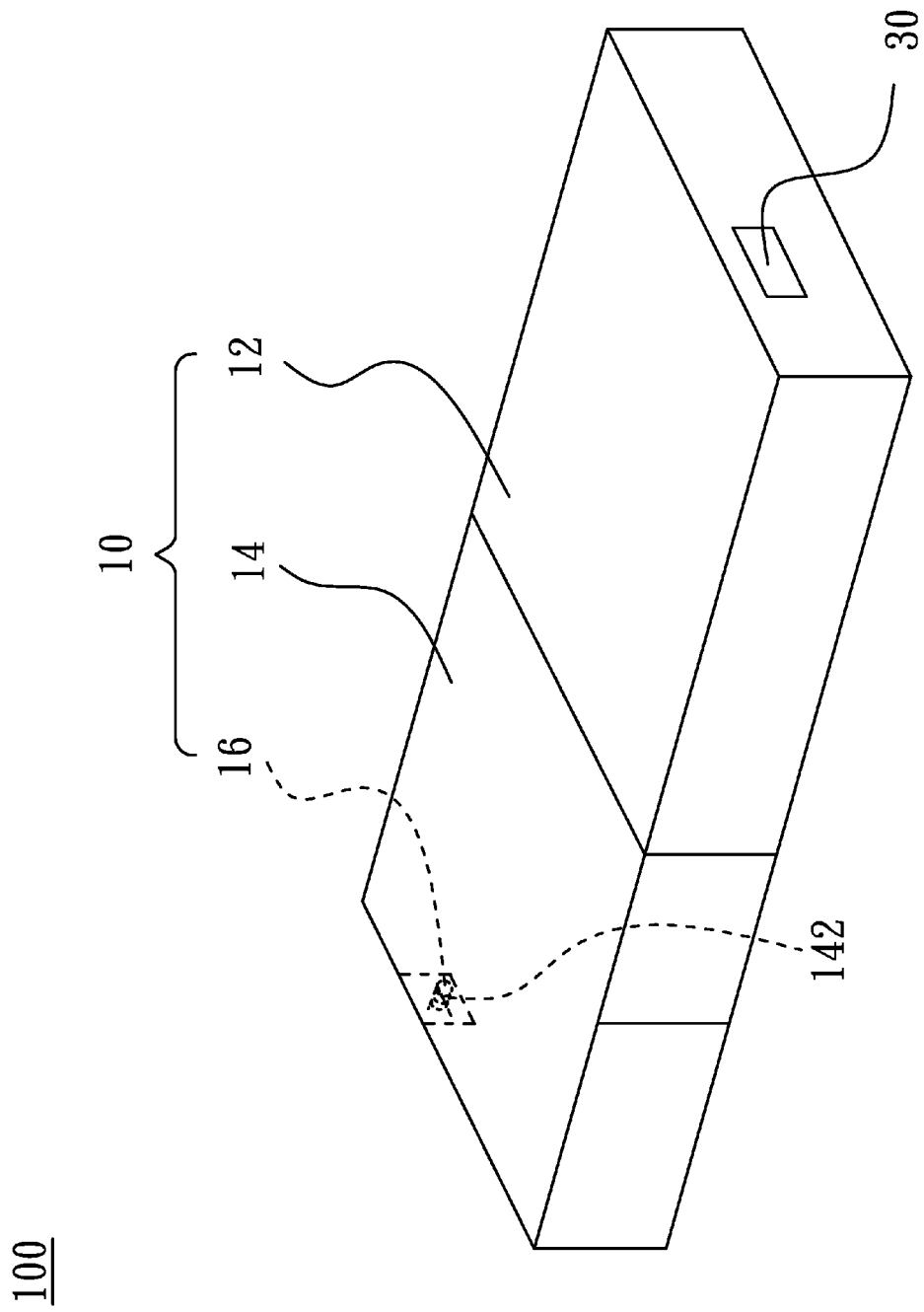
FIG. 2A is a schematic view of the pico projector of FIG. 1.
Figure 2B:
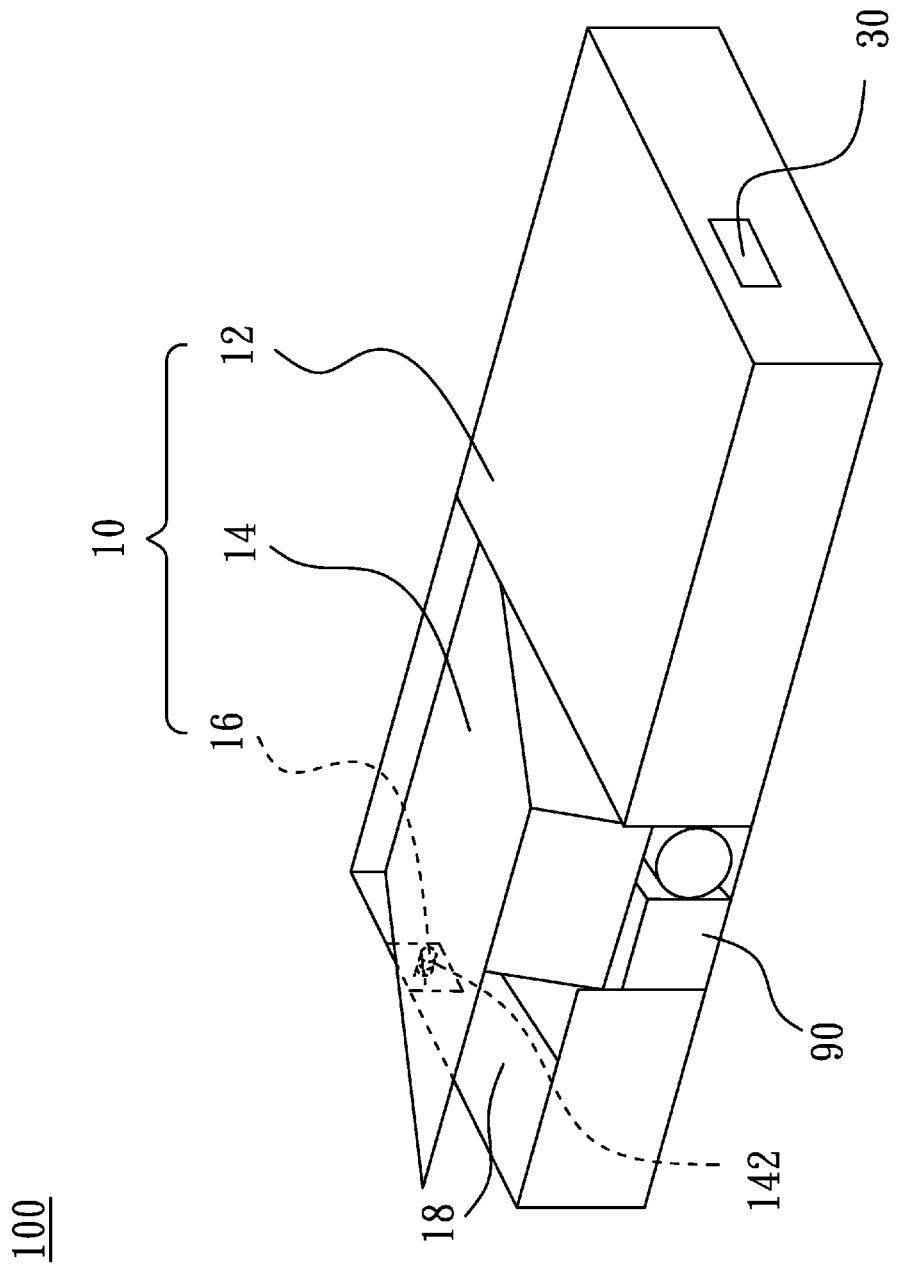
FIG. 2B is a schematic view of the pico projector of FIG. 2A, wherein a cover is opened.

Referring to FIGS. 1, 2A and 2B, the housing 10 includes a main body 12, a cover 14 and a pivot portion 16. The main body 12 and the cover 14 form a closed space, and the cover 14 is rotatably connected to the main body 12 by the pivot portion 16.

The motor 60 is electrically connected to the central processing module 20. When the control module 30 receives a command, the control module 30 outputs a control signal to the central processing module 20. When the central processing module 20 receives the control signal, the central processing module 20 controls the motor 60 to push the cover 14 or rotate the pivot portion 16 according to the control signal so as to open the cover 14 through the rotation of the pivot portion 16 and create an opening 18 on the housing 10 to allow heat convection to occur so as to reduce temperature in the housing 10. The command can be input manually by a user or preset in the pico projector 100.

The control module 30 can be a power switch or a single functional key. When the pico projector 100 is turned on through operation of the power switch under the condition that the control module 30 is the power switch of the pico projector 100, the control module 30 immediately outputs a control signal to the central processing module 20 to open the cover 14. When the pico projector 100 is turned on under the condition that the control module 30 is the single functional key, the cover 14 cannot be opened unless the single functional key is pushed.

Although the control module 30 is fixed to the main body 12 in this embodiment, the control module 30 can be disposed on the cover 14 in another embodiment.

In another embodiment, the control module 30 includes a remote controller (not shown). The remote controller can be disposed outside the housing 10 and electrically connected to the central processing module 20 through a wired means such as a cable (not shown) or a wireless means such as a wireless LAN (WLAN), Bluetooth or infrared ray.

In another embodiment, the housing 10 further includes an elastic element 142 disposed between the cover 14 and the pivot portion 16 and exerting a force on the cover 14 to rotate the cover 14 with respect to the main body 12. When the central processing module 20 receives a control signal, the central processing module 20 controls the motor 60 to move the cover 14 or rotate the pivot portion 16. At this time, the elastic element 142 eliminates gaps between the cover 14 and the pivot portion 16, whereby the cover 14 is opened or closed stably. The elastic element can be a torsion spring 142 or an extension spring knot shown).

Figure 3A:
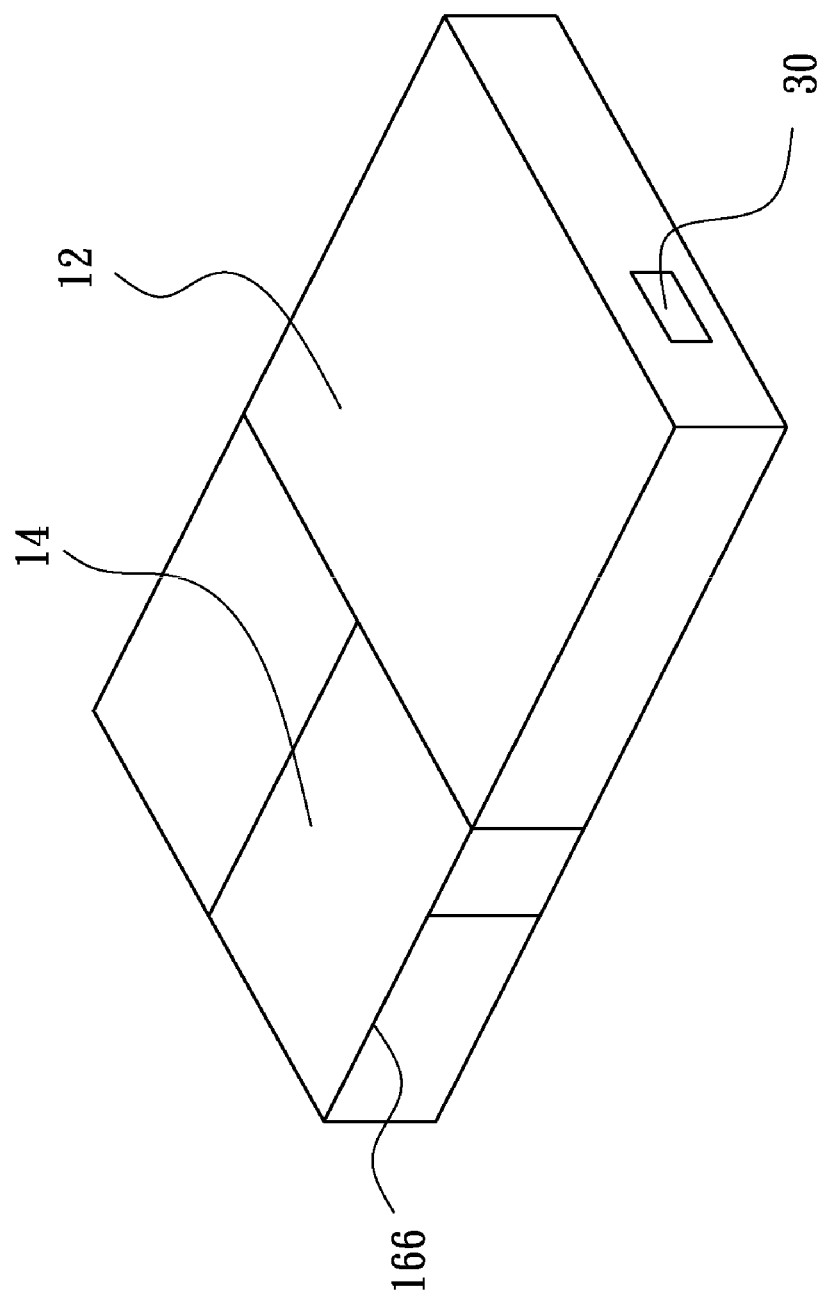
FIG. 3A is a schematic view of a second embodiment of a pico projector of the invention.
Figure 3B:
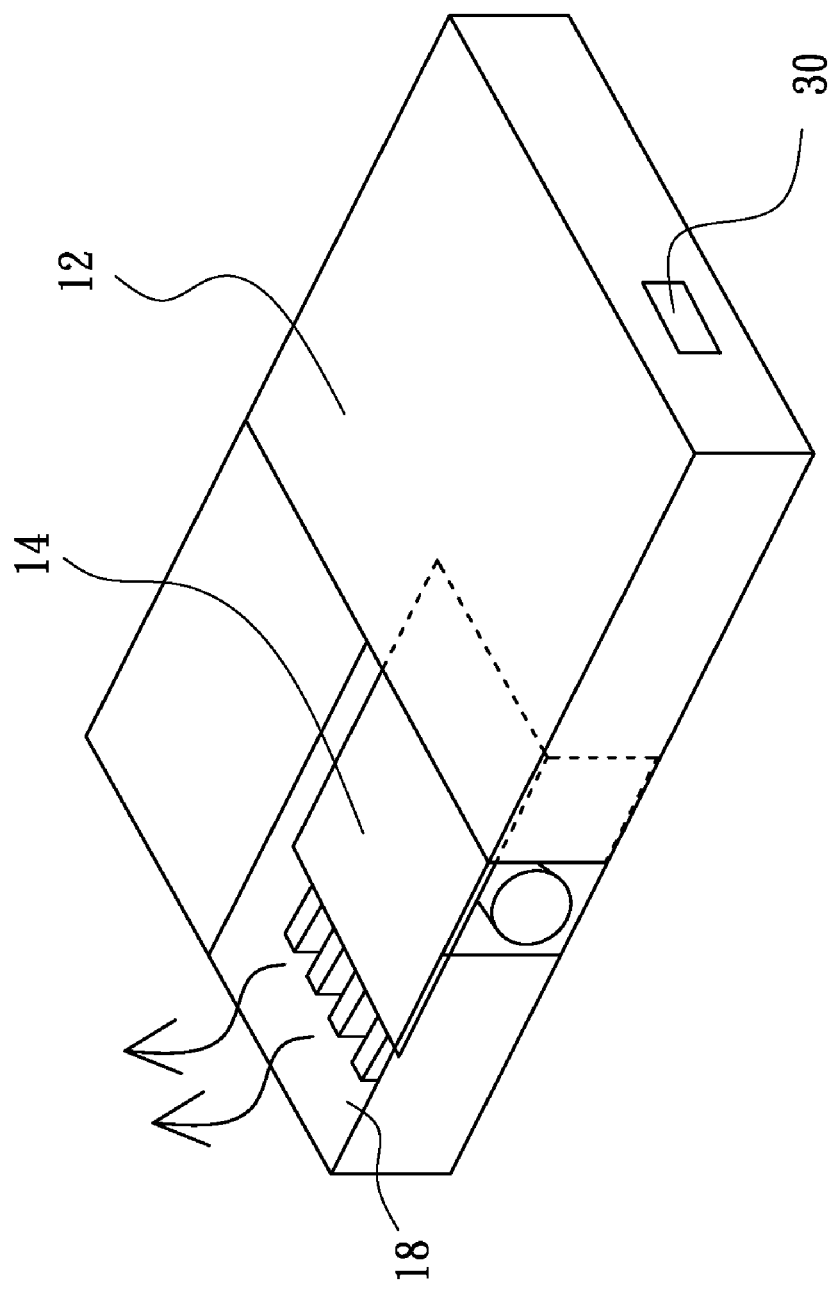
FIG. 3B is a schematic view of a pico projector of FIG. 3A, wherein a cover is opened.

The cover 14 can have various structures. FIGS. 3A and 3B depict a pico projector according to a second embodiment of the invention, wherein the same elements in this embodiment and the previous embodiments are presented by the same reference numerals. A rail 166 is disposed on the main body 12, and the cover 14 is movable on the main body 12 through the rail 166. When the central processing module 20 receives a control signal from the control module 30, the central processing module 20 controls the motor 60 to move the cover 14 along the rail 166, so as to create the opening 18. Similarly, an elastic element is disposed between the cover 14 and the rail 166 in this embodiment. When the motor 60 moves the cover 14, the elastic element enables the cover 14 to move stably.

Figure 4A:
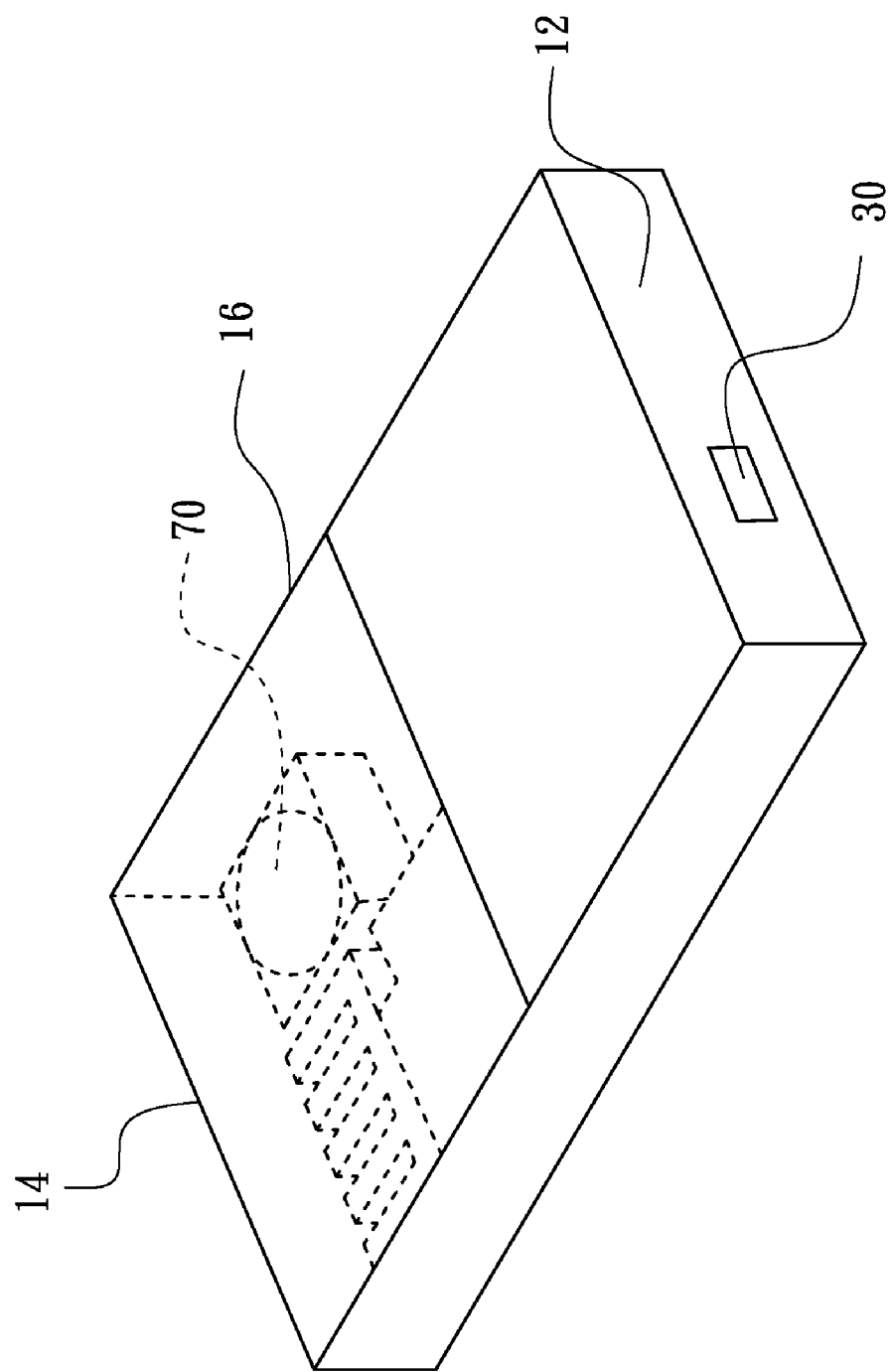
FIG. 4A is a schematic view of third embodiment of a pico projector of the invention.
Figure 4B:
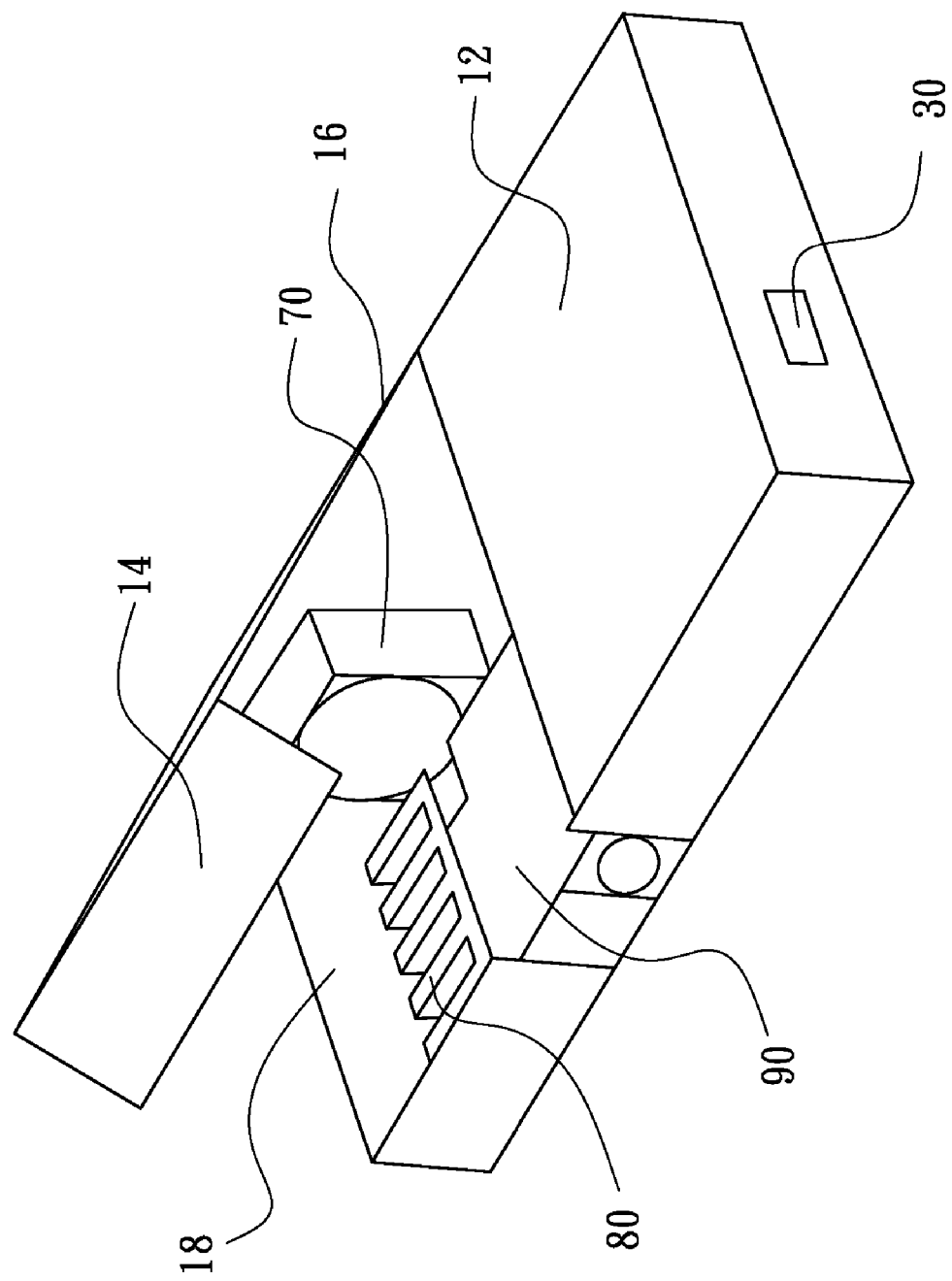
FIG. 4B is a is a schematic view of the pico projector of FIG. 4A, wherein a cover is opened.

FIGS. 4A and 4B depict a pico projector according to a third embodiment of the invention, wherein the same elements in this embodiment and the previous embodiments are presented by the same reference numerals. A fan 70 is connected to the cover 14, and the cover 14 moves the fan when the cover 14 is rotated.

Referring to FIG. 4A, when the cover 14 covers the opening 18, the main body 12 and the cover 14 form a closed space and the fan 70 lies down in the closed space. When the cover 14 is rotated through the pivot portion 16 relative to the main body 12 as shown in FIG. 4B, the fan 70 is erected and provides air flow for the heat sink 80 and the light engine 90 to carry heat generated by the light engine 90, and the heated air flow leaves the housing 10 through the opening 18. The fan 70 is moved by the cover 14 to change the direction, position or angle of the air flow so as to increase heat dissipation efficiency.

Figure 5:
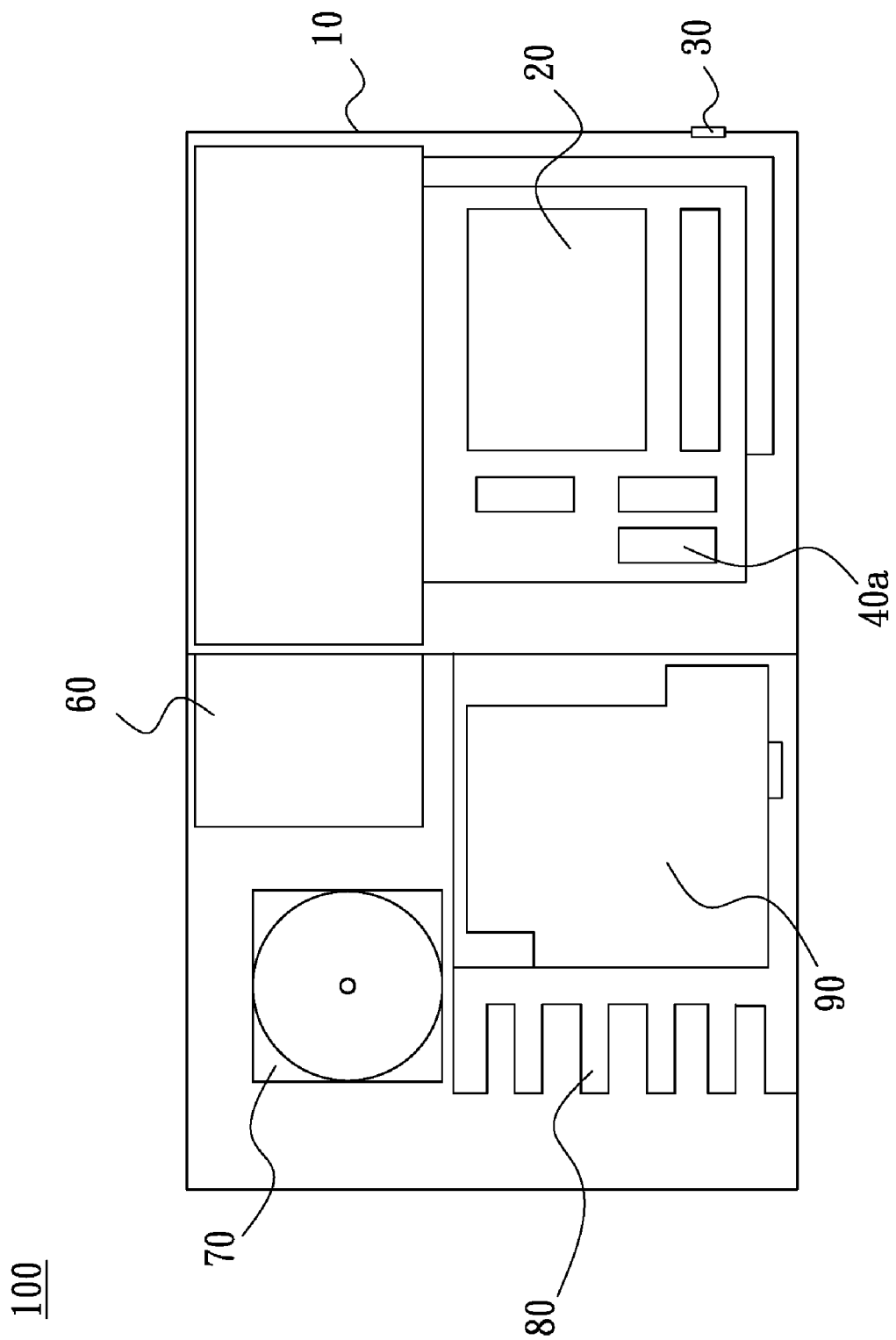
FIG. 5 depicts an arrangement of interior elements of a pico projector according to a fourth embodiment of the invention.

As described, the control module 30 is utilized to move or rotate the cover 14. However, the cover 14 can be moved or rotated by other means. For example the cover 14 can be moved manually by a user. In another embodiment, as shown in FIG. 5, the pico projector 100 further includes a temperature sensing module 40a which is capable of detecting an environment temperature and outputting a temperature signal to the central processing module 20. When the central processing module 20 receives the temperature signal, the central processing module 20 controls the motor 60 to move the cover 14 so as to create the opening 18.

The temperature signal can be a temperature value, a temperature difference value or a warning signal. The central processing module 20 determines whether the cover 14 is opened according to the temperature value or the temperature difference value in this embodiment. In another embodiment, the temperature sensing module 40a outputs a warning signal to the central processing module 20 to open the cover 14 when the temperature value or the temperature difference value of the detected environment temperature is greater than a predetermined value.

Figure 6:
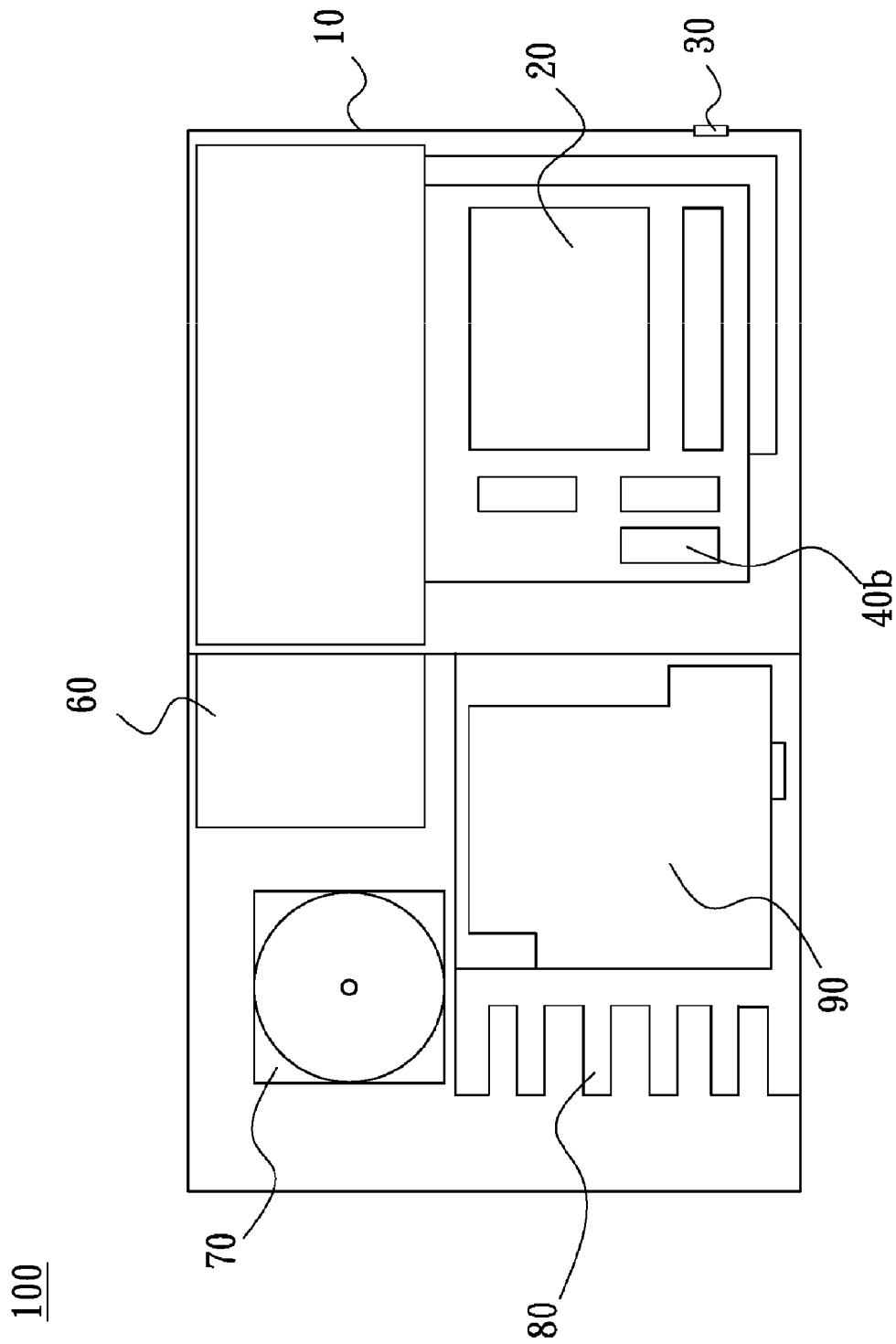
FIG. 6 is a block diagram of a fifth embodiment of a pico projector of the invention.

FIG. 6 depicts a pico projector according to a fifth embodiment of the invention, wherein the same elements in this embodiment and the previous embodiments are presented by the same reference numerals. The pico projector 100 includes a timing module 40b which is configured to measure time or count down from an initial time and output a control signal to the central processing module 20 after a predetermined period. When the central processing module 20 receives the control signal, the motor 60 opens the cover 14 to create the opening 18. The initial time can be the time that the pico projector 100 is turned on or booted up, but it is not limited thereto. Other time points may be set as the initial time.

In the described embodiments, the cover 14 shelters the lens 50 for protection before the opening 18 is created by means of the movement or rotation of the cover 14.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pico projector, comprising:
   a housing comprising a main body and a cover;
   a lens disposed in the housing;
   a light engine disposed in the housing and configured to produce light comprising image signals and project the light through the lens;
   a control module configured to provide a control signal;
   a central processing module disposed in the housing and configured to rotate or move the cover with respect to the main body according to the control signal so as to create an opening for enhancing heat dissipation of an interior of the housing; and
   a remote controller having wired or wireless electrical connection to the central processing module for controlling the cover to rotate or move.

2. The pico projector as claimed in claim 1, wherein the control module comprises a power switch or a single functional key.

3. The pico projector as claimed in claim 1, wherein the control module is disposed on the housing.

4. The pico projector as claimed in claim 1, wherein the remote controller is disposed outside the housing.

5. The pico projector as claimed in claim 1, wherein the control module comprises a temperature sensing module disposed in the housing and configured to detect an environment temperature and output a temperature signal, and the central processing module is configured to rotate or move the cover with respect to the main body according to the temperature signal so as to create an opening for enhancing heat dissipation of an interior of the housing.

6. The pico projector as claimed in claim 5, wherein the temperature signal comprises a temperature value or a temperature difference value, and the central processing module rotates or moves the cover according to the temperature value or the temperature difference value.

7. The pico projector as claimed in claim 5, wherein the temperature signal comprises a temperature warning signal which is provided by the temperature sensing module when a temperature value or a temperature difference value of the detected environment temperature is greater than a predetermined value, and the central processing module rotates or moves the cover according to the temperature warning signal.

8. The pico projector as claimed in claim 5 further comprising a fan joined to the cover and generating air flow for heat dissipation of the interior of the housing, wherein the fan is moved to change a direction, a position or an angle of the air flow when the cover is rotated or moved.

9. The pico projector as claimed in claim 5, wherein the lens is sheltered by the cover before the cover is rotated or moved to create the opening.

10. The pico projector as claimed in claim 1 further comprising a fan joined to the cover and generating air flow for heat dissipation of the interior of the housing, wherein the fan is moved to change a direction, a position or an angle of the air flow when the cover is rotated or moved.

11. The pico projector as claimed in claim 1 further comprising an elastic element disposed between the cover and the main body to stably rotate or move the cover.

12. The pico projector as claimed in claim 1, wherein the lens is sheltered by the cover before the cover is rotated or moved to create the opening.

13. A pico projector, comprising:
    a housing comprising a main body and a cover;
    a lens disposed in the housing;
    a light engine disposed in the housing and configured to produce light comprising image signals and project the light through the lens;
    a timing module outputting a control signal at predetermined time;
    a central processing module disposed in the housing and configured to rotate or move the cover with respect to the main body according to the control signal so as to create an opening for enhancing heat dissipation of an interior of the housing; and
    a remote controller having wired or wireless electrical connection to the central processing module for controlling the cover to rotate or move.

14. The pico projector as claimed in claim 13 further comprising a fan joined to the cover and generating air flow for heat dissipation of the interior of the housing, wherein the fan is moved to change a direction, a position or an angle of the air flow when the cover is rotated or moved.

15. The pico projector as claimed in claim 13 further comprising an elastic element disposed between the cover and the main body to stably rotate or move the cover.

16. The pico projector as claimed in claim 13, wherein the lens is sheltered by the cover before the cover is rotated or moved to create the opening.

17. A pico projector, comprising:
    a housing comprising a main body and a cover rotatable or movable with respect to the main body to create an opening for enhancing heat dissipation of an interior of the housing;
    a lens disposed in the housing;
    a light engine disposed in the housing and configured to produce light comprising image signals and project the light through the lens; and
    a temperature sensing module configured to output a temperature signal, wherein the cover is rotated or moved with respect to the main body according to the temperature signal.

18. The pico projector as claimed in claim 17 further comprising a fan joined to the cover and generating air flow for heat dissipation of the interior of the housing, wherein the fan is moved to change a direction, a position or an angle of the air flow when the cover is rotated or moved.

19. The pico projector as claimed in claim 17 further comprising an elastic element disposed between the cover and the main body to stably rotate or move the cover.

20. The pico projector as claimed in claim 17, wherein the lens is sheltered by the cover before the cover is rotated or moved to create the opening.

* * * * *